United States Patent
Bhattacharya et al.

(10) Patent No.: US 10,922,334 B2
(45) Date of Patent: Feb. 16, 2021

(54) MIXTURE MODEL BASED TIME-SERIES CLUSTERING OF CRIME DATA ACROSS SPATIAL ENTITIES

(71) Applicant: Conduent Business Services, LLC, Dallas, TX (US)

(72) Inventors: Sakyajit Bhattacharya, Kolkata (IN); Mahima Suresh, College Station, TX (US); Shisagnee Banerjee, Bangalore (IN); Sharanya Eswaran, Bangalore (IN); Tridib Mukherjee, Bangalore (IN); Todd Redmond, Los Angeles, CA (US); Koustuv Dasgupta, Bangalore (IN)

(73) Assignee: Conduent Business Services, LLC, Florham Park, NJ (US)

( * ) Notice: Subject to any disclaimer, the term of this patent is extended or adjusted under 35 U.S.C. 154(b) by 623 days.

(21) Appl. No.: 15/674,896

(22) Filed: Aug. 11, 2017

(65) Prior Publication Data
US 2019/0050473 A1  Feb. 14, 2019

(51) Int. Cl.
*G06F 16/00* (2019.01)
*G06F 16/28* (2019.01)
(Continued)

(52) U.S. Cl.
CPC ............ *G06F 16/285* (2019.01); *G06F 16/29* (2019.01); *G06F 16/9537* (2019.01); *G06Q 50/26* (2013.01)

(58) Field of Classification Search
CPC .... G06F 16/285; G06F 16/29; G06F 16/9537; G06Q 50/26
See application file for complete search history.

(56) References Cited

U.S. PATENT DOCUMENTS

| | | | |
|---|---|---|---|
| 7,369,961 B2 | 5/2008 | Castelli et al. | |
| 8,732,219 B1 * | 5/2014 | Ferries | G06F 16/444 707/825 |

(Continued)

OTHER PUBLICATIONS

Andrews, J. L. et al., Model-based clustering, classification, and discriminant analysis via mixtures of multivariate t-distributions, Stat. Comp. (2012) 22:1021-1029.

(Continued)

*Primary Examiner* — Diedra McQuitery
(74) *Attorney, Agent, or Firm* — Ortiz & Lopez, PLLC; Kermit D. Lopez; Luis M. Ortiz

(57) ABSTRACT

A crime analysis system, method, and apparatus comprising at least one processor and a storage device communicatively coupled to the at least one processor, the storage device storing instructions which, when executed by the at least one processor, cause the processor to perform operations comprising receiving information provided by one or more data collection source, storing the information, wherein the stored information is formatted, processing the information to generate crime clustering data associated with at least one region and at least one crime, processing the crime clustering data associated with at least one region and at least one crime to generate benchmarking of the at least one region with at least one other region, and providing crime clustering data associated with at least one region and at least one crime, and benchmarking of the at least one region with at least one other region for presentation through a user interface.

14 Claims, 8 Drawing Sheets

(51) Int. Cl.
*G06Q 50/26* (2012.01)
*G06F 16/29* (2019.01)
*G06F 16/9537* (2019.01)

(56) References Cited

U.S. PATENT DOCUMENTS

| | | | |
|---|---|---|---|
| 8,762,379 | B2 | 6/2014 | Birdwell et al. |
| 8,849,728 | B2 | 9/2014 | Ebert et al. |
| 8,949,164 | B1* | 2/2015 | Mohler .................. G06N 7/005 706/46 |
| 9,129,219 | B1* | 9/2015 | Robertson ............... G06N 5/048 |
| 9,245,000 | B2 | 1/2016 | Marvasti et al. |
| 9,715,668 | B1* | 7/2017 | Brandt ............... G06Q 10/0631 |
| 2006/0271533 | A1 | 11/2006 | Sakurai |
| 2008/0114564 | A1* | 5/2008 | Ihara ..................... G06K 9/6215 702/158 |
| 2009/0018996 | A1* | 1/2009 | Hunt .................... G06F 16/2264 |
| 2010/0223276 | A1* | 9/2010 | Al-Shameri ......... G06K 9/0063 707/769 |
| 2011/0261067 | A1* | 10/2011 | Trinko ............... G01C 21/3461 345/589 |
| 2013/0057551 | A1* | 3/2013 | Ebert .................... G06K 9/6218 345/440 |

OTHER PUBLICATIONS

Biernacki, C. et al., Assessing a Mixture Model for Clustering with the Integrated Complete Likelihood, IEEE Transactions on Pattern Analysis and Machine Intelligence (2000) 22(7):719-725.
Brown, D. E. et al., Data Mining Time Series with Applications to Crime Analysis, 2001 IEEE International Conference on Systems, Man, and Cybernetics, Oct. 7-10, 6 pages.
Buczak, A. L. et al., Fuzzy Association Rule Mining for Community Crime Pattern Discovery, ISI-KDD Jul. 25, 2010, Washington, D.C., 10 pages.
The CompStat Process: Managing Performance on the Pathway to Leadership, The Police Chief Magazine (2006) 73 (9), 6 pages.
Corduas, M. et al., Time series clustering and classification by the autoregressive metric, Computational Statistics & Data Analysis (2008) 52:1860-1872.
CrimeStat: Spatial Statistics Program for the Analysis of Crime Incident Locations, U.S. Department of Justice, Office of Justice Programs, National Institute of Justice—NIJ.gov, printed Aug. 7, 2017, 5 pages.
Davies, D. L. et al., A Cluster Separation Measure, IEEE Transactions on Pattern Analysis and Machine Intelligence (1979) PAMI-1(2):224-227.
Dunn, J. C., A Fuzzy Relative of the ISODATA Process and Its Use in Detecting Compact Well-Separated Clusters, Journal of Cybernetics (1974) 3(3):32-57.
Eck, J. E. et al., Mapping Crime: Understanding Hot Spots, U.S. Department of Justice, Office of Justice Programs, National Institute of Justice, Aug. 2005, 79 pages.
Fraley, C. et al., Model-Based Clustering, Discriminant Analysis, and Density Estimation, Journal of the American Statistical Association (2002) 97:611-631.
Fu, T-C. et al., Pattern Discovery from Stock Time Series Using Self-Organizing Maps, Workshop Notes of KDD 2001 Workshop on Temporal Data Mining, San Francisco, CA, Aug. 26-29, 2001, pp. 27-37.
Goutte, C. et al., On Clustering fMRI Time Series, NeuroImage (1999) 9:298-310.
Kale, D. C. et al., An Examination of Multivariate Time Series Hashing with Applications to Health Care, 2014 IEEE International Conference on Data Mining (ICDM), Dec. 14-17, 10 pages.
Keogh, E. et al., Towards Parameter-Free Data Mining, KDD Aug. 22-25, 2004, Seattle, WA, 12 pages.
Kumar, M. et al., Clustering Seasonality Patterns in the Presence of Errors, KDD, 2002 Edmonton, Alberta, Canada, 7 pages.
Liao, T. W., Clustering of time series data—a survey, Pattern Recognition (2005) 38:1857-1874.
Maharaj, E. A., A Significance Test for Classifying ARMA Models, J. Statist. Comput. Simul. (1996) 54:305-331.
Maharaj, E.A., Clusters of Time Series, Journal of Classification (2000) 17:297-314.
McNicholas, P. D. et al., Discussion of 'Model-based clustering and classification with non-normal mixture distributions' by Lee and McLachlan, Stat. Methods Appl. (2013) 22:467-472.
Mohler, G. O. et al., Self-Exciting Point Process Modeling of Crime, Journal of the American Statistical Association (2011) 106(493):100-108.
Morchen, F., Time series feature extraction for data mining using DWT and DFT, Univ. (pub.) 2003, vol. 33, 31 pages.
Resource Guide Uniform Crime Reporting Program, NACJD, printed Aug. 7, 2017, 9 pages.
Nanopoulos, A. et al., Feature-based Classification of Time-series Data, Information Processing and Technology, Nova Science Publishers, Inc., Commack, NY, 2001, pp. 49-61.
The National Criminal Intelligence Sharing Plan, United States Department of Justice, Oct. 2003, 54 pages.
Neema, I. et al., Improved methods for surveying and monitoring crimes through likelihood based cluster analysis, International Journal of Criminology and Sociological Theory (2010) 3(2):477-495.
Parvez, M. R. et al., A Novel Approach to Identify Spatio-Temporal Crime Pattern in Dhaka City, ICTD '16, Jun. 3-6, Ann Arbor, MI, 4 pages.
Rand, W. M., Objective Criteria for the Evaluation of Clustering Methods, Journal of the American Statistical Association (1971) 66(336):846-850.
Ratcliffe, J. H., Aoristic Signatures and the Spatio-Temporal Analysis of High Volume Crime Patterns, Journal of Quantitative Criminology (2002) 18(1):23-43.
Ratcliffe, J. H., Intelligence-led Policing, Australian Institute of Criminology, Apr. 2003, Canberra, Australia, 6 pages.
Rousseeuw, P. J., Silhouettes: a graphical aid to the interpretation and validation of cluster analysis, Journal of Computational and Applied Mathematics (1987) 20:53-65.
Shekhar, S. et al., Trends in Spatial Data Mining, Data Mining: Next Generation Challenges and Future Directions (2004) Chapter 19, 23 pages.
Smirnov , N., Table for Estimating the Goodness of Fit of Emperical Distributions, Annals of Mathematical Statistics (1948) 19:279-281.
Stephens, M. A., EDF Statistics for Goodness of Fit and Some Comparisons, Journal of the American Statistical Association (1974) 69(347):730-737.
Tran, D. et al., Fuzzy C-Means Clustering-Based Speaker Verification, AFSS 2002, LNAI 2275, Pal, N. R., (eds.) pp. 318-324.
Veran, S. et al., Modeling spatiotemporal dynamics of outbreaking species: influence of environment and migration in a locust, Ecology (2015) 96(3):737-748.
Vlachos, M. et al., A Wavelet-Based Anytime Algorithm for K-Means Clustering of Time Series, Proc. Workshop on Clustering High Dimensionality Data and Its Applications (2003) pp. 23-30.
Nang, X. et al., Characteristic-Based Clustering for Time Series Data, Data Mining and Knowledge Discovery (2006) 13:335-364.
Wang, T. et al., Learning to Detect Patterns of Crime, Joint European Conference on Machine Learning and Knowledge Discovery in Databases (2013) pp. 515-530.
Wilpon, J. G. et al., A Modified K-Means Clustering Algorithm for Use in Isolated Work Recognition, IEEE Transactions on Acoustics, Speech, and Signal Processing (1985) ASSP-33(3):587-594.
Xiong, Y. et al., Mixtures of ARMA Models for Model-Based Time Series Clustering, 2002 IEEE International Conference on Data Mining, Dec. 9-12, 4 pages.

* cited by examiner

600

Probability Densities of First Dimension of the Scaled Feature Set for (a) Murder and (b) Robbery Data

MIXTURE MODEL BASED TIME-SERIES CLUSTERING OF CRIME DATA ACROSS SPATIAL ENTITIES

FIELD OF THE INVENTION

Embodiments are generally related to the field of computing. Embodiments are also related to the field of crime. Embodiments are further related to methods and systems for crime analysis. Embodiments are also related to crime pattern analysis. Embodiments are further related to methods and systems for mixture model based time-series clustering of crime data across spatial entities.

BACKGROUND

Recent years have seen a surge in the use of intelligence led policing for efficient and proactive management of crimes in various judicial and law enforcement agencies. The National Criminal Intelligence Sharing Plan (NCISP), introduced in 2003, is an example of prior methods for processing intelligence, i.e., information collection and analysis. Some of the initial efforts in intelligence led policing are more than two decades old, (e.g., COMPSTAT, introduced by the New York City Police Department (NYPD)). COMPSTAT is the process of providing a periodical statistical summary of crime related information across different regions within the jurisdictions and doing a performance appraisal.

Further, it has been mandated by the Federal Bureau of Investigation (FBI) for law enforcement agencies in the United States (US) to publicly share various crime related data summaries.

While the crime information collection process has been formalized at different granularities (from individual stations within agencies' jurisdictions to an aggregate level for the entire jurisdiction), the analysis of crime information has been confined to simple statistical summaries in most practical settings. To realize the potential of intelligence led policing, more finesse must be built around analyzing the data beyond simple, prior art statistical summaries currently employed.

Crime data mining literature has generally focused on understanding spatio-temporal patterns (e.g., hot spot detection, etc.) in crimes and subsequent projections or predictions of crimes. Prior art methods have failed to consider a structured comparison among different spatial entities. The problem is further complicated by the fact that crime pattern can follow a temporal dependency, e.g., crimes in one month may be dependent on crimes in other months, or there are periodic surges in crimes in a certain category in specific months of the year, and so on.

Accordingly, there is a need in the art for methods and systems that more accurately collect and synthesize crime related data.

SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide a method and system for crime analysis.

It is another aspect of the disclosed embodiments to provide a method and system for clustering crime related data.

It is another aspect of the disclosed embodiments to provide a method and system for benchmarking crime related data.

It is yet another aspect of the disclosed embodiments to provide an enhanced method and system for crime pattern analysis.

It is yet another aspect of the disclosed embodiments to provide an enhanced method and system for mixture model based time-series clustering and benchmarking of crime data across spatial entities.

The aforementioned aspects and other objectives and advantages can now be achieved as described herein. A method and system for crime analysis comprises at least one processor and a storage device communicatively coupled to the at least one processor, the storage device storing instructions which, when executed by the at least one processor, cause the processor to perform operations comprising receiving information provided by one or more data collection source, storing the information, wherein the stored information is formatted, processing the information to generate crime clustering data associated with at least one region and at least one crime, processing the crime clustering data associated with at least one region and at least one crime to generate benchmarking of the at least one region with at least one other region, and providing crime clustering data associated with at least one region and at least one crime, and benchmarking of the at least one region with at least one other region for presentation through a user interface.

BRIEF DESCRIPTION OF THE FIGURES

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
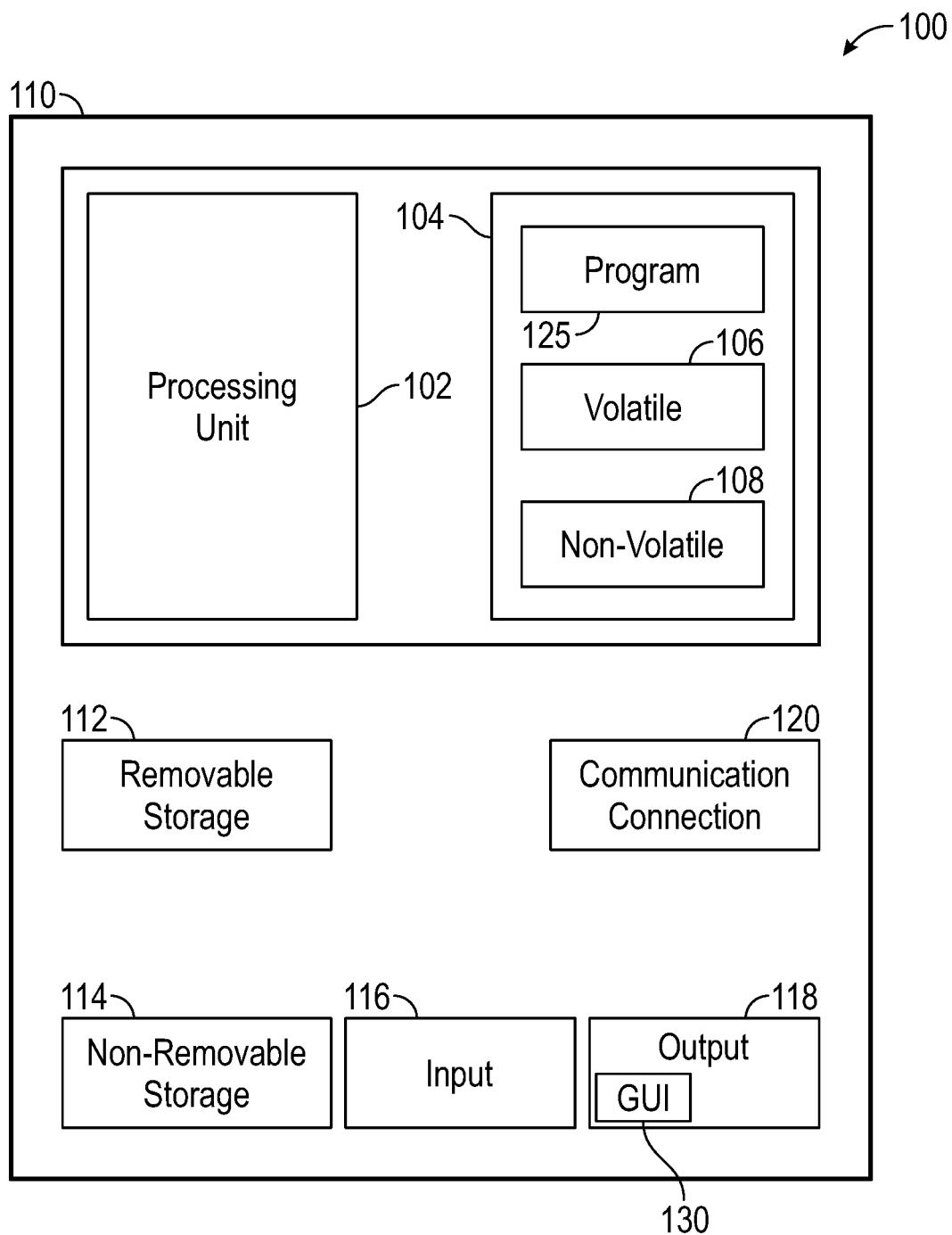
FIG. 1 depicts a block diagram of a computer system which is implemented in accordance with the disclosed embodiments.
Figure 2:
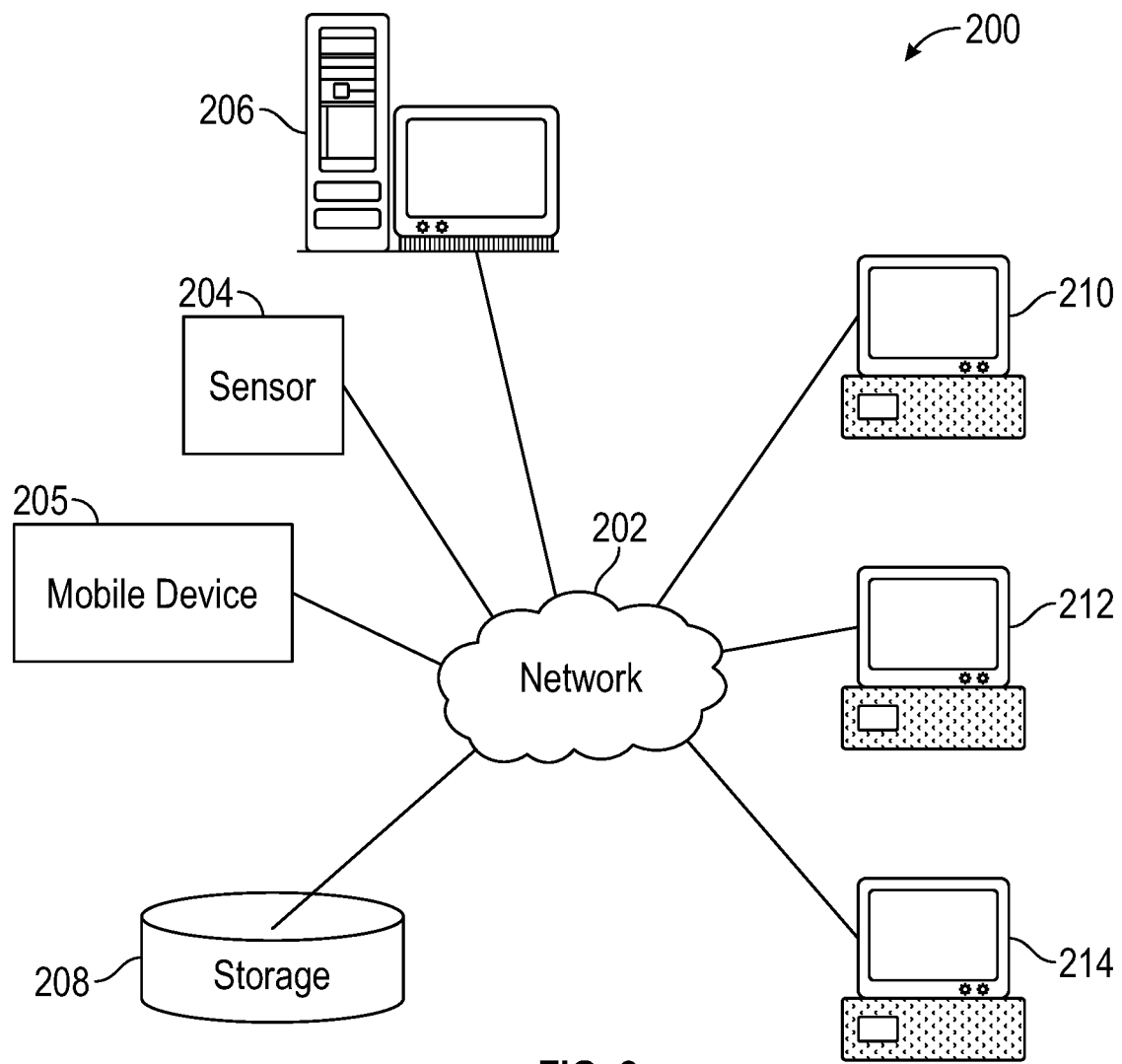
FIG. 2 depicts a graphical representation of a network of data-processing devices in which aspects of the present invention may be implemented.
Figure 3:
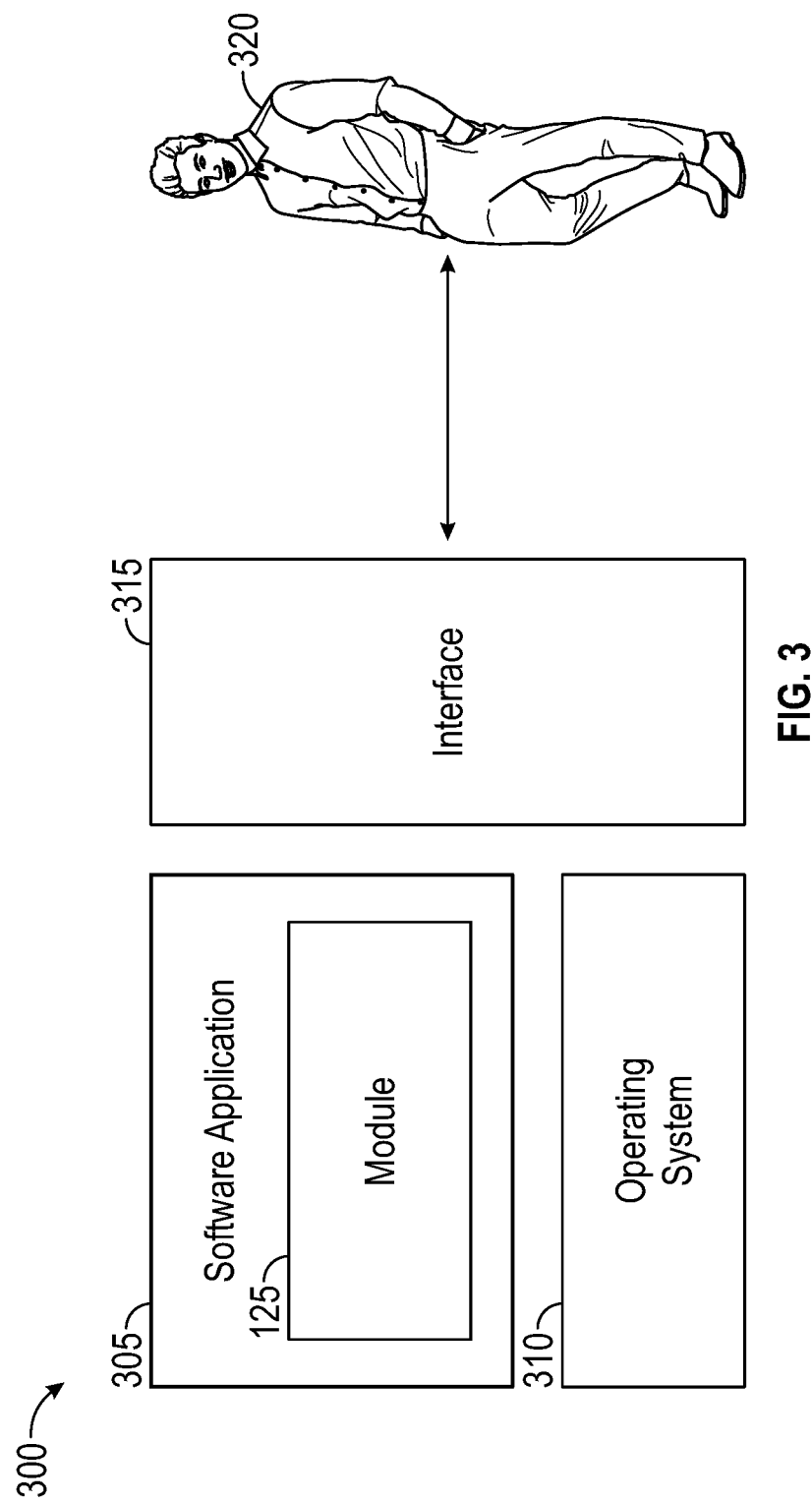
FIG. 3 depicts a computer software system for directing the operation of the data-processing system depicted in FIG. 1, in accordance with an example embodiment.

FIGS. 1-3 are provided as exemplary diagrams of data-processing environments in which embodiments of the present invention may be implemented. It should be appreciated that FIGS. 1-3 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

A block diagram of a computer system 100 that executes programming for implementing the methods and systems disclosed herein is shown in FIG. 1. A general computing device in the form of a computer 110 may include a processing unit 102, memory 104, removable storage 112, and non-removable storage 114. Memory 104 may include volatile memory 106 and non-volatile memory 108. Computer 110 may include or have access to a computing environment that includes a variety of transitory and non-transitory computer-readable media such as volatile memory 106 and non-volatile memory 108, removable storage 112 and non-removable storage 114. Computer storage includes, for example, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions as well as data, including data comprising frames of video.

Computer 110 may include or have access to a computing environment that includes input 116, output 118, and a communication connection 120. The computer may operate in a networked environment using a communication connection to connect to one or more remote computers or devices. The remote computer may include a personal computer (PC), server, router, network PC, a peer device or other common network node, or the like. The remote device may include a sensor, photographic camera, video camera, tracking device, or the like. The communication connection may include a Local Area Network (LAN), a Wide Area Network (WAN), or other networks. This functionality is described in more fully in the description associated with FIG. 2 below.

Output 118 is most commonly provided as a computer monitor, but may include any computer output device. Output 118 may also include a data collection apparatus associated with computer system 100. In addition, input 116, which commonly includes a computer keyboard and/or pointing device such as a computer mouse, computer track pad, or the like, allows a user to select and instruct computer system 100. A user interface can be provided using output 118 and input 116. Output 118 may function as a display for displaying data and information for a user and for interactively displaying a graphical user interface (GUI) 130.

Note that the term "GUI" generally refers to a type of environment that represents programs, files, options, and so forth by means of graphically displayed icons, menus, and dialog boxes on a computer monitor screen. A user can interact with the GUI to select and activate such options by directly touching the screen and/or pointing and clicking with a user input device 116 such as, for example, a pointing device such as a mouse, and/or with a keyboard. A particular item can function in the same manner to the user in all applications because the GUI provides standard software routines (e.g., module 125) to handle these elements and report the users actions. The GUI can further be used to display the electronic service image frames as discussed below.

Computer-readable instructions, for example, program module 125, which can be representative of other modules described herein, are stored on a computer-readable medium and are executable by the processing unit 102 of computer 110. Program module 125 may include a computer application. A hard drive, CD-ROM, RAM, Flash Memory, and a USB drive are just some examples of articles including a computer-readable medium.

FIG. 2 depicts a graphical representation of a network of data-processing systems 200 in which aspects of the present invention may be implemented. Network data-processing system 200 is a network of computers in which embodiments of the present invention may be implemented. Note that the system 200 can be implemented in the context of a software module such as program module 125. The system 200 includes a network 202 in communication with one or more clients 210, 212, and 214. Network 202 is a medium that can be used to provide communications links between various devices and computers connected together within a networked data processing system such as computer system 100. Network 202 may include connections such as wired communication links, wireless communication links, or fiber optic cables. Network 202 can further communicate with one or more servers 206, one or more external devices such as a printer, copier, scanner, fax machine, multi-function device, multi-function printer, sensor, detector or the like 204, a mobile device 205, and a memory storage unit such as, for example, memory or database 208.

In the depicted example, device 204 and server 206 connect to network 202 along with storage unit 208. In addition, clients 210, 212, and 214 connect to network 202. These clients 210, 212, and 214 may be, for example, personal computers or network computers. Computer system 100 depicted in FIG. 1 can be, for example, a client such as client 210, 212, and/or 214. Alternatively, clients 210, 212, and 214 may also be, for example, a photographic camera, video camera, tracking device, sensor, etc.

Computer system 100 can also be implemented as a server such as server 206, depending upon design considerations. In the depicted example, server 206 provides data such as boot files, operating system images, applications, and application updates to clients 210, 212, and 214, and/or to device 204. Clients 210, 212, and 214 and video device 204 are clients to server 206 in this example. Network data-processing system 200 may include additional servers, clients, and other devices not shown. Specifically, clients may connect to any member of a network of servers, which provide equivalent content.

In the depicted example, network data-processing system 200 is the Internet with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages. Of course, network data-processing system 200 may also be implemented as a number of different types of networks such as, for example, an intranet, a local area network (LAN), or a wide area network (WAN). FIGS. 1 and 2 are intended as examples and not as architectural limitations for different embodiments of the present invention.

FIG. 3 illustrates a computer software system 300, which may be employed for directing the operation of the data-processing systems such as computer system 100 depicted in FIG. 1. Software application 305, may be stored in memory 104, on removable storage 112, or on non-removable storage 114 shown in FIG. 1, and generally includes and/or is associated with a kernel or operating system 310 and a shell or interface 315. One or more application programs, such as module(s) 125, may be "loaded" (i.e., transferred from removable storage 112 into the memory 104) for execution by the data-processing system 100. The data-processing system 100 can receive user commands and data through user interface 315, which can include input 116 and output 118, accessible by a user 320. These inputs may then be acted upon by the computer system 100 in accordance with instructions from operating system 310 and/or software application 305 and any software module(s) 125 thereof.

Generally, program modules (e.g., module 125) can include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked personal computers, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application such as a computer program designed to assist in the performance of a specific task such as word processing, accounting, inventory management, etc.

The interface 315 (e.g., a graphical user interface 130) can serve to display results, whereupon a user 320 may supply additional inputs or terminate a particular session. In some embodiments, operating system 310 and GUI 130 can be implemented in the context of a "windows" system. It can be appreciated, of course, that other types of systems are possible. For example, rather than a traditional "windows" system, other operation systems such as, for example, a real time operating system (RTOS) more commonly employed in wireless systems may also be employed with respect to operating system 310 and interface 315. The software application 305 can include, for example, module(s) 125, which can include instructions for carrying out steps or logical operations such as those shown and described herein.

The following description is presented with respect to embodiments of the present invention, which can be embodied in the context of a data-processing system such as computer system 100, in conjunction with program module 125, and data-processing system 200 and network 202 depicted in FIGS. 1-2. The present invention, however, is not limited to any particular application or any particular environment. Instead, those skilled in the art will find that the system and method of the present invention may be advantageously applied to a variety of system and application software including database management systems, word processors, and the like. Moreover, the present invention may be embodied on a variety of different platforms including Macintosh, UNIX, LINUX, and the like. Therefore, the descriptions of the exemplary embodiments, which follow, are for purposes of illustration and not considered a limitation.

The embodiments disclosed herein achieve two primary goals. First, the embodiments provide methods and systems for accurately identifying geographical regions producing comparable crime related data, as compared to a reference region. It should be appreciated that the granularity of the region is not fixed. The embodiments can be applied, for example, to specific regions in a city, multiple cities, states, or even countries in order to identity other regions with comparable criminal and/or law enforcement characteristics.

The embodiments further provide methods and systems for benchmarking one or multiple crime related statistics for a reference jurisdiction against other similar jurisdictions in order to identify patterns in criminal activity and/or policing practice. This data allows the reference regional authority to review and improve its policing practices by determining how those practices are similar to, or different from, other similar regions with better or worse outcomes illustrated in the timewise data from the region.

Figure 4:
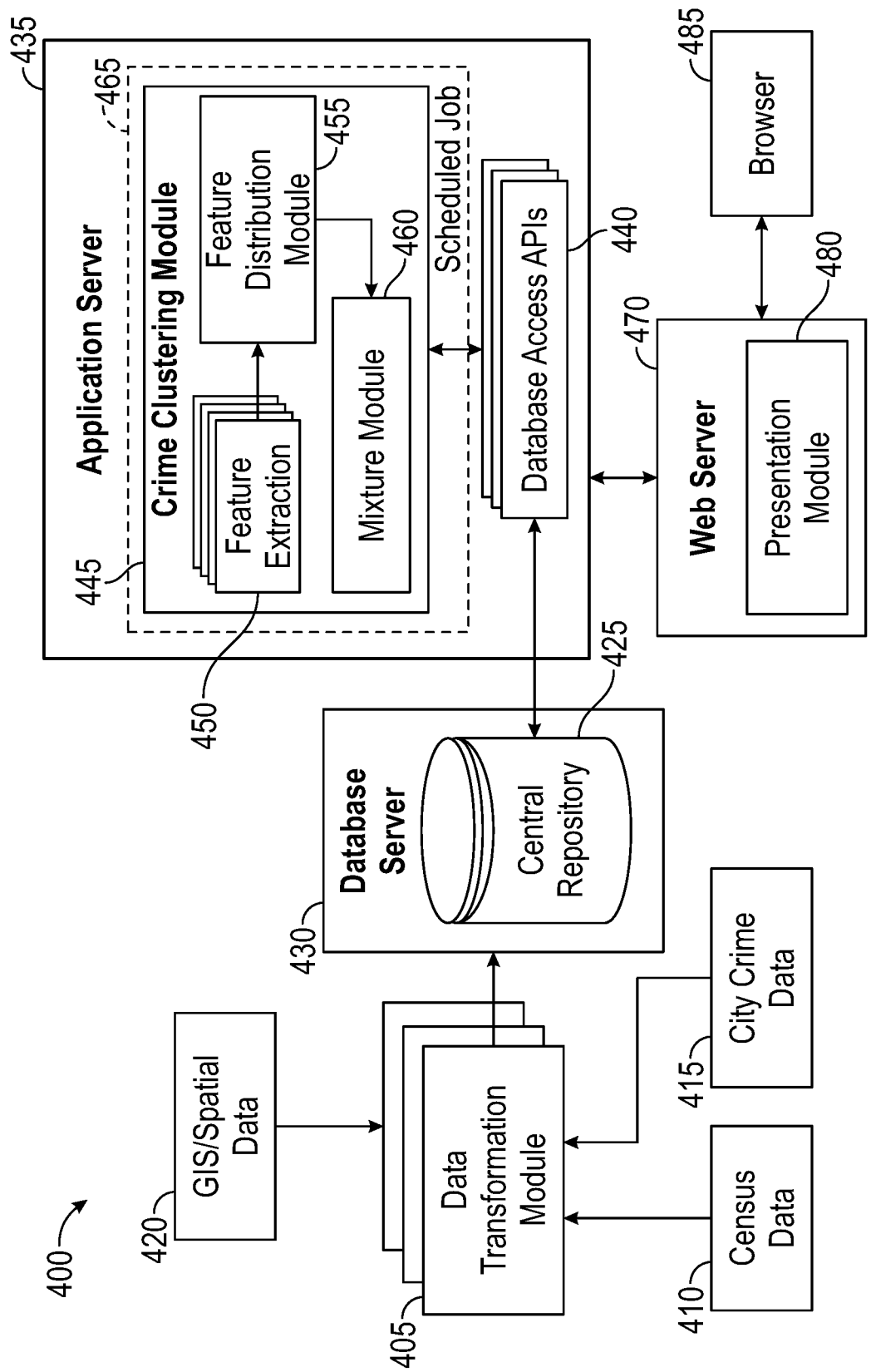
FIG. 4 depicts a block diagram of a system for clustering and benchmarking spatial entities according to similarity of crime related data in accordance with the disclosed embodiments.

FIG. 4 illustrates a system 400 for clustering spatial entities according to similarity of crime related data and benchmarking crime related statistics from a reference jurisdiction. A data transformation module 405 can receive input data from one or more spatially defined regions. In certain embodiments, those regions can be user defined and can include neighborhoods, areas within a city, multiple cities, states, or countries. It should be understood that the granularity of the spatially defined regions can be adjusted according to user preference.

The input data can include a number of different types of data. Such data can include census data 410 indicative of demographics for a given region, regional crime data 415 (e.g., city crime data) including statistics indicative of criminal activity in a given region, and GIS/Spatial Data 420 that defines the physical location and characteristics of a region of interest. The regional crime data 415 can include information regarding the frequency of various crimes, as well as other crime related data such as prosecution rate, conviction rate, sentence length, recidivism data, etc. It should be understood that other types of data can also be provided to the data transformation service 405.

The data transformation module accepts the provided data and transforms it into a specified format so that it can be stored in a central repository 425 associated with a database server 430. The central repository serves as a structured data storage system where formatted data from the data transformation module can be stored, and served to a database access application programming interface (API) 440 associated with an application server 435.

The data is then accessible by the crime clustering module 445. The crime clustering module 445 includes a feature extraction module 450, a feature distribution module 455, and a mixture module 460. The functions of each of these modules are provided in greater detailer herein. However, at a high level, when a scheduled job 465 is passed to the crime clustering module 445, the feature extraction module 450 extracts one or more features from the data associated with the job. Next, the feature distribution module 455 identifies the distribution of those features so that the mixture module can apply a mixture model to the job. At this point the job is passed to a web server 470 where the job is configured for presentation to the user with the presentation module 480. This includes formatting the job to be presented via a Graphical User Interface that can be, for example, associated with a web browsing application 485.

Accordingly, the system 400 provides clustering of spatial entities based on the similarity of crime and operations patterns over time. In an embodiment, the crime clustering module 445 comprises a mixture model based time-series clustering framework, which uses a robust set of statistical and domain-level features for clustering across spatial entities. Driven by crime domain specific data characteristics provided to the data transformation module 405, the crime clustering module 445 handles heterogeneity in the time-series data from a scheduled job 465 according to both spatial parameters and crime types. In this regard, in addition to extracting features specific to time series data, such as periodicity and auto-correlation coefficients, the crime clustering module 445 can also extract additional domain-level features. Next, the crime clustering module 445 can identify the distribution that each crime type follows and use that in the mixture model provide by mixture module 460.

For example, in crime data, features may be best characterized according to (for example) a heavy-tail distribution across cities for robbery, while they follow a Gaussian distribution for murder, rape, and assaults. In such a case, a T Mixture Model (TMM) and a Gaussian Mixture Model (GMM) can be used. The system 400 performs clustering using a mixture model with a different, suitable, distribution for each crime type, thereby handling heterogeneity in crime types. The distribution of each crime category is obtained by fitting historical data. Furthermore, the embodiments provide methods and systems that identify prototypical spatial entities upon which other entities can be modelled. This provides operational insights which can be configured and presented to the user via browser 485. The presentation is configured such that it conveys insights into why, when, and how one location is performing better (or worse) than another.

By handling the heterogeneity of crime data, the system 400 provides excellent performance and can identify prototypical spatial entities based on performance (e.g., no. of arrests per crime) of other spatial entities. Such performance can be benchmarked. Accordingly, the crime clustering module 445 can also provide a framework that makes a structured comparison and/or benchmark crimes and operations in spatial entities based on time-series data.

Figure 5:
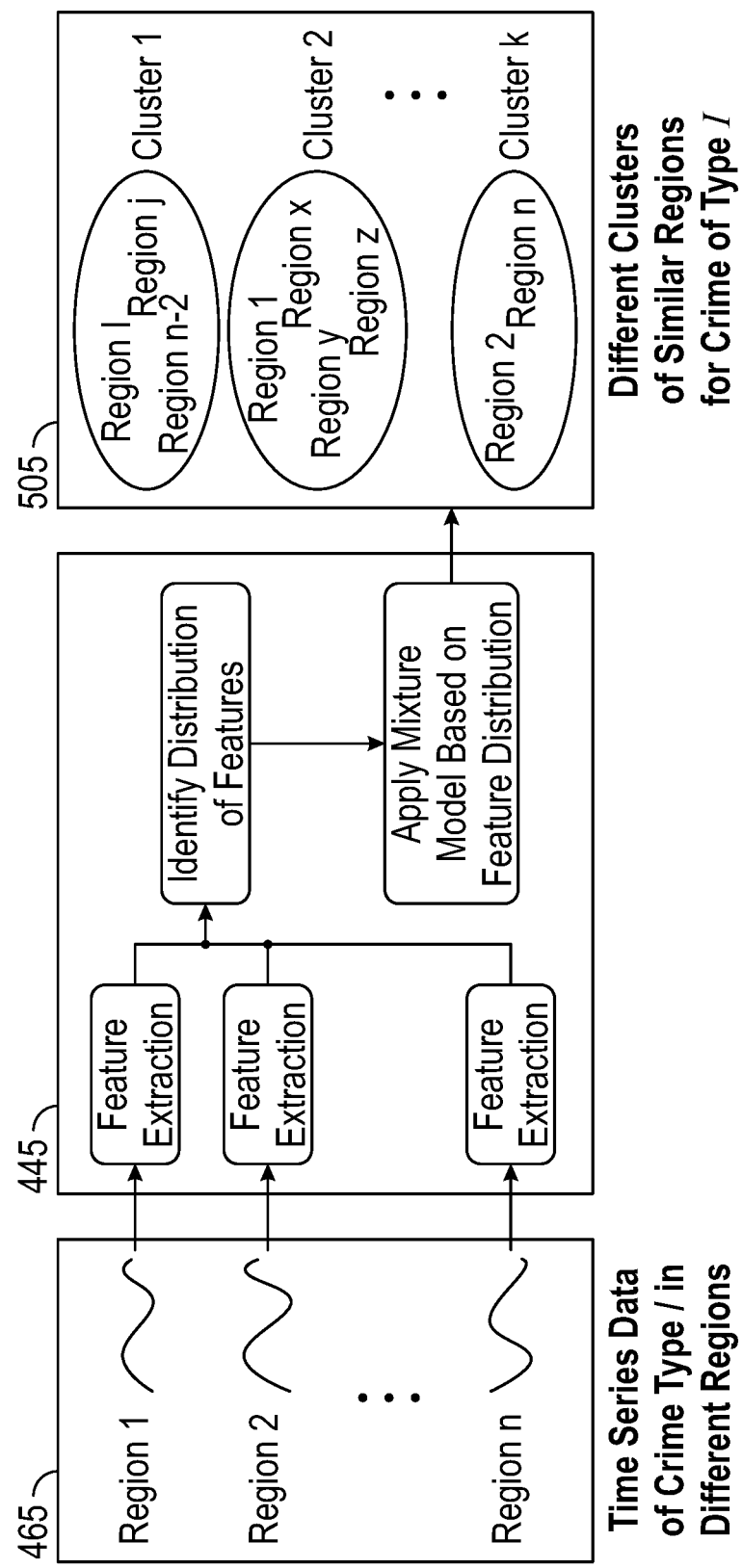
FIG. 5 depicts a block diagram of a framework for clustering and benchmarking spatial entities according to similarity of crime related data in accordance with the disclosed embodiments.

FIG. 5 illustrates the framework for crime clustering module 445. The scheduled job 465 comprises formatted time-series data of crime types in different regions. The scheduled job 465 provides that data to the feature extraction module 450 associated with crime clustering module 445.

The feature extraction module 450 provides structural feature extraction of the time-series data. In an embodiment, feature extraction can take advantage of a Maharaj's distance metric. A Maharaj's distance is indicative of a moving average factor along with the number of changes in direction in the time series data. A Maharaj's distance can capture a desired similarity metric across spatial entities. In some cases, the feature extraction module 450 can scale the feature to [0;1] space to indicate the strength of the feature in the time series. A feature having a value close to 0 indicates minimal existence and a feature having value close to 1 indicates strong existence. The feature measures are obtained from each individual time-series data set.

In an embodiment, the extracted features can include trend, seasonality, serial correlation, non-linearity, skewness, kurtosis, self-similarity, chaos, frequency of periodicity, average Maharaj Distance, moving average factor, and number of direction changes. It should be appreciated that in other embodiments, other features can also be extracted. Among these features, some are present only in the original data, and some can be found after de-trending and de-seasonalizing the data, and some are present in both datasets.

In certain embodiments, the Average Maharaj distance is a tool used for feature extraction. An Autoregressive Moving Average (ARMA) time series with autoregression parameter p and moving average parameter q can be defined according to equation (1) as follows:

$$Y_T = \lambda + \sum_{i=1}^{p} \psi_i Y_{T-i} + \sum_{i=1}^{q} \theta_i \epsilon_{T-i} + \epsilon_T \quad (1)$$

In Equation (1), $\lambda$ is a constant, $\epsilon_i$'s is are white noise, $\psi_i$'s are the autoregression parameters and $\theta_i$'s are the moving average parameters. For such ARMA processes, discrepancy measures based on hypotheses testing can be used to determine whether or not two time series $X_T$ and $Y_T$ have significantly different generating processes. The output metric of this algorithm is called the Maharaj distance and can be used to find whether the time series are similar to each other. A p-value is computed from the Maharaj distance which lies between 0 and 1. A p-value close to 1 indicates the two time series are similar, and a p-value close to 0 indicates the two time series are different. For purposes of feature extraction, the average Maharaj distance (AMD) for the time series related to the i-th region can computed as according to Equation (2) as follows:

$$\Sigma_{j \neq i}^{N} MD_{ij}/(N-1) \quad (2)$$

In equation (2), $MC_{ij}$ is the Maharaj distance of the time series of region i from the time series of region j, and N is the total number of regions. This gives the average dissimilarity of a region from other regions.

The number q as defined in Equation 1 is thus the moving average factor. In addition, the number of direction change can be determined. For a certain region, an increase or decrease in crime is an important indicator of the overall crime pattern of that region. If number of crimes increase very frequently from a previous time interval, that can be a discriminatory factor in comparison to those regions where crime patterns remain static. The number of changes in direction in the time series can therefore be determined. Specifically, for a region's data $Y_T$, a function $\delta T$ such that $\delta 1 = \delta 2 + 0$. Accordingly, equation (3) expresses:

$$\delta_T = \begin{cases} 0 & \text{if } Y_T \geq Y_{T-1} \geq Y_{T-2} \text{ or } Y_T \leq Y_{T-1} \leq Y_{T-2} \\ 1 & \text{otherwise} \end{cases} \quad (3)$$

Let $\Delta = T\delta T$. Then $\Delta$ is the sum of the number of direction changes and is taken to be the new feature.

With feature extraction complete, the feature distribution module 455 is then employed to identify feature distribution. The methods and systems disclosed herein use a mixture model-based approach for clustering as described below.

The reason for using a mixture model comes from the intrinsic assumption that the regions are not homogeneous and that crime patterns vary.

As such, a candidate list of mixture distributions C includes a Gaussian mixture, a t mixture, a chi-square mixture, a poisson mixture, and an inverse Gaussian mixture. One can denote $M_k$ as the kth member of C. Let $Y_{T_i}$ be the set of extracted features. $M_k$ can then be fit to $Y_{T_i}$, and an estimation the parameters using an Expectation Maximization (EM) algorithm can be performed. Let the fitted likelihood be L. Then the Bayesian Information Criteria (BIC) can be used to extract information from the fitted model. BIC for a fitted model with likelihood L is defined in equation (4) as:

$$\text{BIC} = 2\log \mathcal{L}(\hat{\vartheta}|x) - p \log n \quad (4)$$

where x is the dataset, $\hat{\vartheta}$ is the maximum likelihood estimate (MLE) of the parameter set $\vartheta$, p is the number of free parameters, and n is the number of observations. Let $\text{BIC}_k$ be the information theoretic criteria corresponding to the kth member of C. Equation (5) can then be defined as follows:

$$k_0 = \arg\max_k \text{BIC}_k \quad (5)$$

$M_{k_0}$ is the best fitted mixture model for the dataset. Thus, a model can be chosen that gives the highest information based on the data. The algorithm can, for example, therefore select a Gaussian mixture model for murder, rape and assault, and a t mixture model for robbery.

Figure 6A:
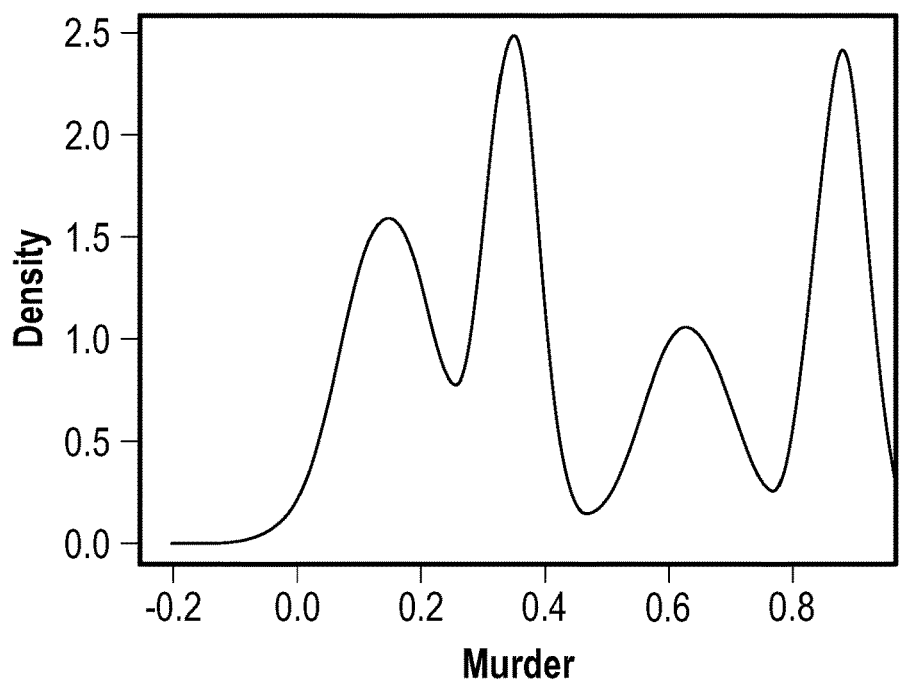
FIGS. 6A-6B depict plots of scaled feature set for crimes in accordance with disclosed embodiments.
Figure 6B:
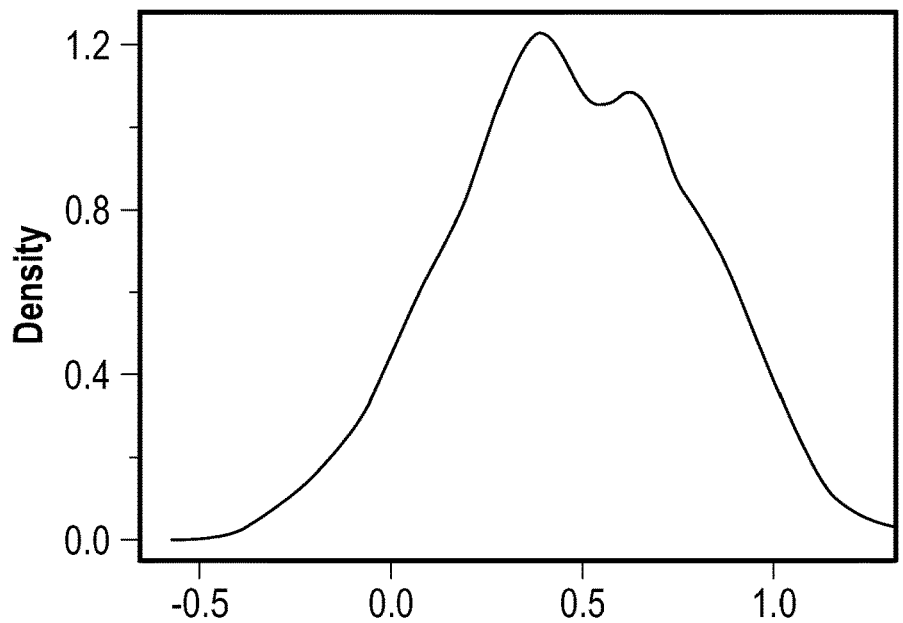

For example, FIG. 6A provides a plot 600, the density of first dimension of the scaled feature set for murder data (Plot (a)). The density of the first dimension suggests a mixture of roughly four probability distributions. Also, it suggests a Gaussian distribution for individual components. Plot (b) of FIG. 6B shows the probability distribution of robbery data for the first dimension of the scaled feature set. This shows the possibility of a heavy tail at both sides. Moreover, the plot suggests that there is a strong possibility that the individual components might not be Gaussian, which can be observed through the non-normal shape and heavy tail of the plot. The plots illustrate the value of the grid search method. It should be appreciated that in some embodiments, such as a heavy-tailed scenario, the assumption of a normal distribution might not be suitable.

As described above, the feature distribution module 455 thus serves to identify the best mixture distribution for the extracted features. The mixture module 460 can then apply the mixture model based on the feature distribution. The resulting clusters indicate similar regions for crime of various types as illustrated at step 505 of FIG. 5. Table 1 provides an algorithm used for clustering by crime clustering module 445.

TABLE 1

Algorithm 1 CriMeClusT framework

Input: n regions with crime (arrest) data arranged in time series
Output: A set of clusters of regions for each crime type
 Filtering For crime type i, select candidate set of regions $\mathcal{R}_i$ by the following rule:
 $\forall_j$ Regions $N_{ijk} \leftarrow$ crime type i in month k in region $R_j$,
 $\mathcal{A}_i \leftarrow \{R_j \mid \Sigma_k N_{ijk} \geq \gamma\}$. $\gamma$ is at pre-delined constant.
 $B_i \leftarrow \{R_j \mid \Sigma_k \delta_{N_{ijk}=0}/K \leq \lambda\}$. $\lambda$ is a pre-defined constant.
 if $R_j \in \mathcal{A}_i \cap B_i$ then
  $R_j \in \mathcal{R}_i$
 end if
 Feature extraction
 for i ∈ (1,2,3,4), j ∈ $\mathcal{R}_i$ do
  $F_{ij} \leftarrow$ 13 features for region j, crime type i TABLE 1-continued Algorithm 1 CriMeClusT framework end for
 for i ∈ (1,2,3,4) do
  Arrange $F_{ij}$s for all the regions in a data matrix format.
  Clustering
  Select a candidate list of mixture distributions C including Gaussian mixture, t mixture, chi-square mixture,
  poisson mixture and inverse Gaussian mixture.
  $M_k \leftarrow$ k-th member of C
  $Y_{T_i} \leftarrow$ The set of extracted features
  Fit $M_k$ to $Y_{T_i}$ and estimate the parameters using EM algorithm
  $\mathcal{L} \leftarrow$ Fitted likelihood
  BIC for fitted parameters, $M_k$ as:

$$\text{BIC}_k = 2\log\mathcal{L}(\hat{\vartheta}|x) - p \log n$$

where is the MLE of the parameter set , $\rho$ is the number of free parameters and n is the number of observations $k_0 \leftarrow \arg\max_k \text{BIC}_k$.

Select $M_{k_0}$ as the best fitted mixture model.
 end for

In certain embodiments, clustering evaluation may be desirable. In the present case, ARI cannot be used because there is no ground truth in the datasets. ARI can be used to find how close an estimated cluster lies to the original cluster. Since there is no concept of an 'original' cluster, performance cannot be measured using ARI. The clustering result can be evaluated based on the data itself. For that purpose the Davies Bouldin Index (DB Index) and its mathematical details can be found. This index is a measurement of similarity between clusters as compared to similarity within clusters. Thus, a lower value in the DB Index means better clustering than that corresponding to a high value. Conceptually, DB Index measures the average similarity between each cluster and the cluster most similar to it. The similarity metric is made certain by averaging. Thus, a lower DB Index value indicates that the clusters are dissimilar to each other, and in turn, indicates good clustering. In other embodiment, other methods like the Dunn Index and Silhouette coefficient can be used, but the DB Index is preferable because it is intuitive and provides sound mathematical justification. It should be further noted that the methods remain unchanged irrespective of the clustering evaluation metric.

Figure 7:
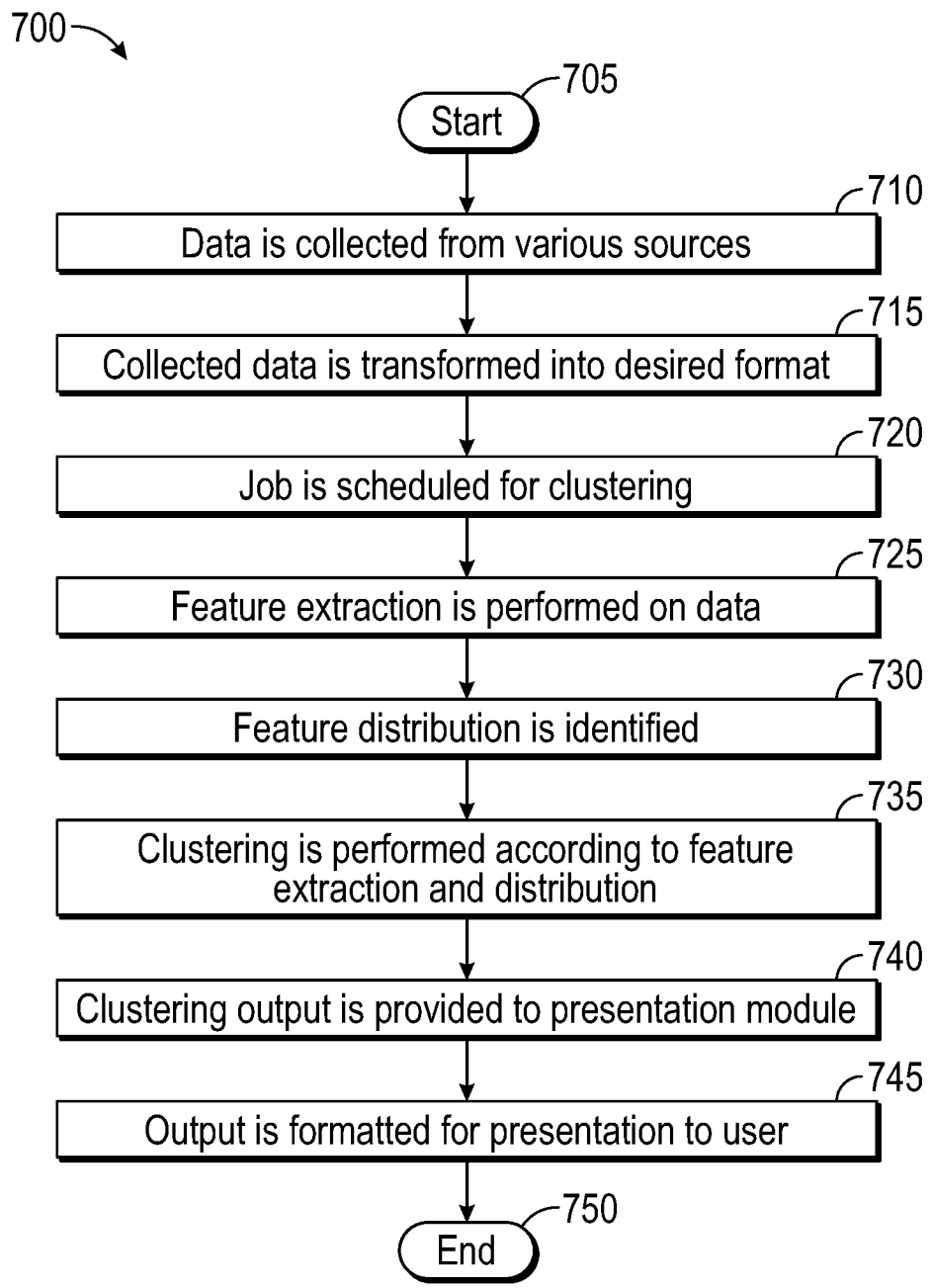
FIG. 7 depicts a flow chart of logical operational steps associated with a method for mixture model based time-series clustering of crime data across spatial entities in accordance with the disclosed embodiments.

FIG. 7 illustrates steps associated with a method 700 for clustering regions based on similarities in their crime data patterns over time. The method begins at step 705. At step 710, data can be collected from a variety of sources. Such data can include census data, city crime data, and GIS/Spatial data. At step 715, the data is transformed into a desireable format and stored in a repository associated with a database server.

Next at step 720, a job is scheduled and the data is provided to a crime clustering module via a database access API. At step 725, a feature extraction process is performed on the time-series data of crime types in different regions associated with the scheduled job to extract features. Next, identification of the distribution of features is initiated at step 730. A mixture mode based approach is used for clustering as illustrated at step 735. In an embodiment, the algorithm illustrated in Table 1 is used for clustering, with a resulting output comprising a set of clusters of regions for each crime type.

The output can then be provided to a presentation module associated with a web server at step 740, where the clusters can be formatted for presentation to a user at step 745. The presentation can include clustering information detailing the grouping of regions based on the similarity of their crime data patterns over time. This can include identification of regions in a particular group that are similar in terms of patterns in and timing of crimes. For example, the presentation can indicate an increase or decrease in the type of crime committed in a given time. This may, for example, indicate that crime increases during certain times of year. The presentation can provide clusters or groups that take into account time series crime patterns. The output can include trends according to one or more features identified after feature extraction. The output can include graphics indicating how the features are distributed across regions. The method ends at step 750.

In another embodiment, benchmarking of spatial entities is provided by system 400. In particular, the clusters of spatial entities generated by crime clustering module 445 can be used for benchmarking the spatial entities. It is important to identify not just benchmarked spatial entities, but also poorly performing spatial entities as well. In this regard, one Key Performance Indicator (KPI) that can be used for a performance appraisal is the arrest to crime ratio. It should be appreciated that other KPIs may also be considered in certain embodiments. If a dataset reveals only crime generally, other sources can be used to collect arrest information. For example, data transformation module 405 can be used to extract data from a source that provides monthly numbers of arrests over a given time frame in specified regions, as well as other demographic information associated with the arrested persons.

For example, if, for a certain number of crimes, the law enforcement agencies in a region make a large number of arrests consistently, this is an indicator that the region is performing well in addressing crime.

Figure 8:
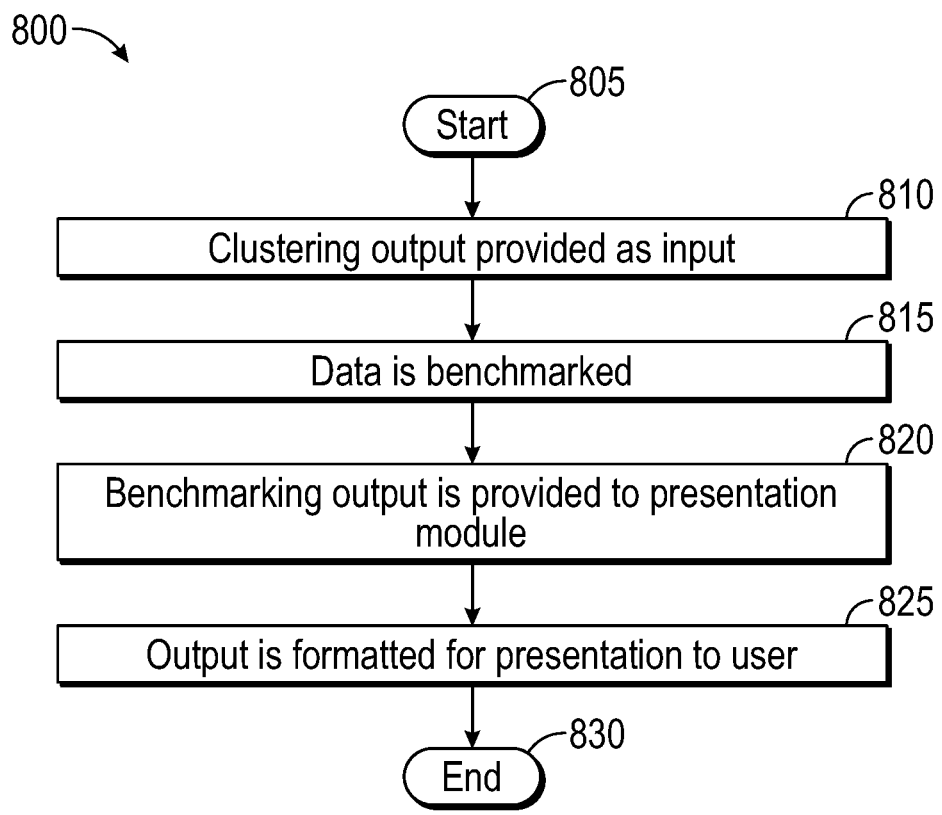
FIG. 8 depicts a flow chart of logical operational steps associated with a method for mixture model based time-series benchmarking of crime data across spatial entities in accordance with the disclosed embodiments.

Considering this, a benchmarking method 800 as illustrated in FIG. 8 can be employed. The method begins at step 805. At step 810, the clustering output can be used as input. The input can include crime series data associated with different regions that have been clustered. Additionally, the total number of a certain crime type in a specified time period can be grouped (i.e., the sum of total crimes for each time period can be taken). Similarly, the sum of total arrests for murder for a given time period can be taken. This time period aggregation is necessary, since often there is a time lag between an actual crime occurrence and the corresponding arrest. Thus, more particularly, the input data can be a given number of regions with crime data arranged in a time series. In certain embodiments, the input can be tailored to a specific problem, selected by the user such as a high crime rate of a given type.

Suppose for a certain region j, the number of murders at quarter i is $x_{ij}$ and the number of arrests for murder at quarter i is $y_{ij}$. The methods and systems disclosed herein provide a new vector given by equation (6):

$$\gamma j = \gamma j1, \ldots \gamma jn = (y1jx1j, \ldots, ynjxnj) \qquad (6)$$

where n is the number of available quarters. Then, for the vector $y_{ij}$ its $L_2$ norm is given as $(i=1n\gamma ji0.5)$. Then for two regions A and B, if the norm of y for region A is greater than norm of y for region B, we can say that region A is doing better than region B in fighting crime. Table 2 provides an algorithm for benchmarking at step 815 according to the embodiments disclosed herein according to the clusters illustrated at step 505 by crime clustering module 445, generated by the algorithm illustrated in Table 1.

TABLE 2

Algorithm 2 Process of Benchmarking Spatial Entities

Input: n regions with crime (arrest) data arranged in time series.
Output: A set of benchmarked regions, each corresponding to an $\mathcal{L}$ P region.
    for i ∈ available quarters, j ∈ all regions do
        $x_{ij}$ ← the number of crimes in region j for quarter i
        $y_{ij}$ ← the number of arrests in region j for quarter i
    end for
    Define $\gamma_j = (\gamma_{j1}, \ldots, \gamma_{jn}) = (y_{1j}/x_{1j}, \ldots, y_{nj}/x_{nj})$,
    where n is the number of available quarters.
    $L_2$ norm]
    for $\gamma_j$ do
        Derive the $L_2$ norm as $\| \gamma_j \|_2 = (\Sigma_{i=1}^n \gamma_{ji}^2)^{1/2}$
    end for
    for $R_j$ ∈ Regions do
        J = total number of regions, $\mathcal{N}$ (A) = |A|, λ = a predefined constant (0.9)
        LP region consists of cities with the lowest (1 − λ) × 100% in performance:
            $\mathcal{L}$ P = {$R_j$ | $\mathcal{N}$ (( $\| \gamma_j \|_2 \leq \| \gamma_{j'} \|_2$ for j' ≠ j) /J ≥ λ}
    end for
    for Region k ∈ $\mathcal{L}$ P do
        Find the cluster $\mathcal{L}_k$ (generated by CriMeClusT) wrt crime data (i.e., set of regions similar to k in terms of crime pattern)
        Identify prototypical region
        for City ∈ $C_k$ do
            Find $L_2$ norm between City and Region k
        end for
        Prototypical region of the k-th region in $\mathcal{L}$ P is city with highest $L_2$ norm
    end for The results of the benchmarking can then be provided to the presentation module at step 820. The presentation module can generate an output at step 825 that defines the best and worst performing regions based on (KPI). The presentation module can further generate an output that provides recommendations to a user according to the benchmarking results. The presentation can include identification of patterns for how certain crime related statistics for various regions over a given time are similar and different. The presentation can further identify best practices according to the comparison crime related statistics for various regions over a given time. The method then ends at step 830.

The methods and systems disclosed herein are configured to provide improved insights into policing and crime prevention uses readily available data. The methods and systems provide information that can lead to better preparedness for proactive management.

In certain embodiments, the output provided to the user can include automatic alerts in case of deviations from expectations in crimes and a structured data-driven comparison across various judicial and law enforcement agencies as well as different sub-divisions within them such as regions, agencies, stations, sub-divisions, etc., based on the time-series patterns and numbers of crimes for different categories.

Such output is valuable for multiple reasons. A spatial entity may exhibit similar temporal patterns in the number of crimes of a particular type with another spatial entity. However, the number of arrests for this crime type may not exhibit the same temporal pattern across these spatial entities. The insights provided according to the methods and systems disclosed herein provide an understanding of the similarities and dissimilarities in crime patterns and arrest patterns across these entities. This allows law enforcement to implement best practices by other agencies which are successfully minimizing crime rates. The output can further be used for benchmarking across agencies in terms of crime related Key Performance Indicators, such as arrest to crime ratio.

Based on the foregoing, it can be appreciated that a number of embodiments, preferred and alternative, are disclosed herein. For example, in one embodiment, a crime analysis system comprising at least one processor; and a storage device communicatively coupled to the at least one processor, the storage device storing instructions which, when executed by the at least one processor, cause the at least one processor to perform operations comprising: receiving information provided by one or more data collection source, storing the information, wherein the stored information is formatted, processing the information to generate crime clustering data associated with at least one region and at least one crime, processing the crime clustering data associated with at least one region and at least one crime to generate benchmarking of the at least one region with at least one other region, and providing crime clustering data associated with at least one region and at least one crime, and benchmarking of the at least one region with at least one other region for presentation through a user interface. In an embodiment, the information comprises at least one of census data, region specific crime data, GIS data, and spatial data.

In an embodiment, processing the information to generate crime clustering data associated with at least one region and at least one crime further comprises extracting features from the information, identifying feature distribution associated with the extracted features, and clustering the information.

In an embodiment, clustering the information further comprises applying a mixture model to the identified extracted features. In an embodiment, extracting features from the information further comprises calculating an average Maharaj distance associated with the information.

In an embodiment, processing the crime clustering data associated with at least one region and at least one crime to generate benchmarking of the at least one region with at least one other region further comprises calculating an L2 Norm between the at least one region and the at least one other region. In an embodiment, providing crime clustering data associated with at least one region and at least one crime, and benchmarking of the at least one region with at least one other region for presentation through a user interface further comprises identifying patterns in crime related statistics for the at least one region over a given time, and identifying best crime prevention practices according to the benchmarking of the at least one region with the at least one other region.

In another embodiment, the formatted information comprises time series data of at least one crime type in at least one region.

In another embodiment, an apparatus comprises one or more computer readable storage media storing instructions which, when executed by at least one processor, cause the at least one processor to perform operations comprising: receiving information provided by one or more data collection source, storing the information, wherein the stored information is formatted, processing the information to generate crime clustering data associated with at least one region and at least one crime, processing the crime clustering data associated with at least one region and at least one crime to generate benchmarking of the at least one region with at least one other region, and providing crime clustering data associated with at least one region and at least one crime, and benchmarking of the at least one region with at least one other region for presentation through a user interface.

In an embodiment of the apparatus, processing the information to generate crime clustering data associated with at least one region and at least one crime further comprises extracting features from the information, identifying feature distribution associated with the extracted features, and clustering the information. In an embodiment, clustering the information further comprises applying a mixture model to the identified extracted features.

In another embodiment of the apparatus, processing the crime clustering data associated with at least one region and at least one crime to generate benchmarking of the at least one region with at least one other region further comprises calculating an L2 Norm between the at least one region and the at least one other region.

In another embodiment, a computer-implemented method comprises receiving information provided by one or more data collection source, storing the information, wherein the stored information is formatted, processing the information to generate crime clustering data associated with at least one region and at least one crime, processing the crime clustering data associated with at least one region and at least one crime to generate benchmarking of the at least one region with at least one other region, and providing crime clustering data associated with at least one region and at least one crime, and benchmarking of the at least one region with at least one other region for presentation through a user interface. The information comprises at least one of census data, region specific crime data, GIS data, and spatial data.

In an embodiment of the method, processing the information to generate crime clustering data associated with at least one region and at least one crime further comprises extracting features from the information, identifying feature distribution associated with the extracted features, and clustering the information. In an embodiment, clustering the information further comprises applying a mixture model to the identified extracted features. In an embodiment of the method, extracting features from the information further comprises calculating an average Maharaj distance associated with the information.

In another embodiment, processing the crime clustering data associated with at least one region and at least one crime to generate benchmarking of the at least one region with at least one other region further comprises calculating an L2 Norm between the at least one region and the at least one other region.

In an embodiment of the method, providing crime clustering data associated with at least one region and at least one crime, and benchmarking of the at least one region with at least one other region for presentation through a user interface further comprises identifying patterns in crime related statistics for the at least one region over a given time, and identifying best crime prevention practices according to the benchmarking of the at least one region with the at least one other region. In an embodiment, the formatted information comprises time series data of at least one crime type in at least one region.

It will be appreciated that variations of the above-disclosed and other features and functions, or alternatives thereof, may be desirably combined into many other different systems or applications. Also, it should be appreciated that various presently unforeseen or unanticipated alternatives, modifications, variations or improvements therein may be subsequently made by those skilled in the art which are also intended to be encompassed by the following claims.

What is claimed is:

1. A crime analysis system comprising:
   at least one processor; and
   a storage device communicatively coupled to said at least one processor, said storage device storing instructions which, when executed by said at least one processor, cause said at least one processor to perform operations comprising:
      receiving information provided by at least one data collection source;
      storing said information, wherein said stored information is formatted;
      processing said information to generate crime clustering data associated with at least one region and at least one crime, wherein said processing of said information to generate crime clustering data associated with said at least one region and said at least one crime further comprises:
         extracting features from said information;
         identifying feature distribution associated with said extracted features; and
         clustering said information according to feature extraction and feature distribution, wherein said clustering of said information further comprises: applying a mixture model based time-series clustering framework to said identified extracted features, wherein said mixture model based time-series clustering framework uses a set of statistical and domain-level features for clustering across spatial entities, and wherein said mixture model based time-series clustering framework handles heterogeneity in time series-data from a scheduled job according to spatial parameters and crime types;
      processing said crime clustering data associated with at least one region and at least one crime to generate benchmarking of said at least one region with at least one other region;
      providing crime clustering data associated with at least one region and at least one crime, and benchmarking of said at least one region with at least one other region for presentation through a user interface; and
      permitting a granulating of said at least one region and said at least one other region to be adjustable according to a user preference.

2. The system of claim 1, wherein said information comprises at least one of: census data; region specific crime data; GIS data; and spatial data.

3. The system of claim 1, wherein extracting features from said information further comprises: calculating an average Maharaj distance associated with said information.

4. The system of claim 1, wherein processing said crime clustering data associated with at least one region and at least one crime to generate benchmarking of said at least one region with at least one other region further comprises: calculating an L2 Norm between said at least one region and said at least one other region.

5. The system of claim 1, wherein providing crime clustering data associated with at least one region and at least one crime, and benchmarking of said at least one region with at least one other region for presentation through a user interface further comprises:
   identifying patterns in crime related statistics for said at least one region over a given time; and
   identifying best crime prevention practices according to said benchmarking of said at least one region with said at least one other region.

6. The system of claim 1, wherein said formatted information comprises time series data of at least one crime type in at least one region.

7. An apparatus comprising non-transitory computer readable storage media storing instructions which, when executed by at least one processor, cause the at least one processor to perform operations comprising:
   receiving information provided by at least one data collection source;
   storing said information, wherein said stored information is formatted;
      processing said information to generate crime clustering data associated with at least one region and at least one crime, wherein said processing of said information to generate crime clustering data associated with said at least one region and said at least one crime further comprises:
         extracting features from said information;
         identifying feature distribution associated with said extracted features; and
         clustering said information according to feature extraction and feature distribution, wherein said clustering of said information further comprises: applying a mixture model based time-series clustering framework to said identified extracted features, wherein said mixture model based time-series clustering framework uses a set of statistical and domain-level features for clustering across spatial entities, and wherein said mixture model based time-series clustering framework handles heterogeneity in time series-data from a scheduled job according to spatial parameters and crime types;
      processing said crime clustering data associated with at least one region and at least one crime to generate benchmarking of said at least one region with at least one other region;
      providing crime clustering data associated with at least one region and at least one crime, and benchmarking of said at least one region with at least one other region for presentation through a user interface; and permitting a granulating of said at least one region and said at least one other region to be adjustable according to a user preference.

8. The apparatus of claim 7, wherein processing said crime clustering data associated with at least one region and at least one crime to generate benchmarking of said at least one region with at least one other region further comprises:
calculating an L2 Norm between said at least one region and said at least one other region.

9. A computer-implemented method comprising:
receiving information provided by at least one data collection source;
storing said information, wherein said stored information is formatted;
processing said information to generate crime clustering data associated with at least one region and at least one crime, wherein said processing of said information to generate crime clustering data associated with said at least one region and said at least one crime further comprises:
extracting features from said information;
identifying feature distribution associated with said extracted features; and
clustering said information according to feature extraction and feature distribution, wherein said clustering of said information further comprises: applying a mixture model based time-series clustering framework to said identified extracted features, wherein said mixture model based time-series clustering framework uses a set of statistical and domain-level features for clustering across spatial entities, and wherein said mixture model based time-series clustering framework handles heterogeneity in time series-data from a scheduled job according to spatial parameters and crime types;
processing said crime clustering data associated with at least one region and at least one crime to generate benchmarking of said at least one region with at least one other region;
providing crime clustering data associated with at least one region and at least one crime, and benchmarking of said at least one region with at least one other region for presentation through a user interface; and
permitting a granulating of said at least one region and said at least one other region to be adjustable according to a user preference.

10. The method of claim 9, wherein said information comprises at least one of: census data; region specific crime data; GIS data; and spatial data.

11. The method of claim 9, wherein extracting features from said information further comprises: calculating an average Maharaj distance associated with said information.

12. The method of claim 9, wherein processing said crime clustering data associated with at least one region and at least one crime to generate benchmarking of said at least one region with at least one other region further comprises: calculating an L2 Norm between said at least one region and said at least one other region.

13. The method of claim 9, wherein providing crime clustering data associated with at least one region and at least one crime, and benchmarking of said at least one region with at least one other region for presentation through a user interface further comprises:
identifying patterns in crime related statistics for said at least one region over a given time; and
identifying best crime prevention practices according to said benchmarking of said at least one region with said at least one other region.

14. The method of claim 9, wherein said formatted information comprises time series data of at least one crime type in at least one region.

* * * * *